Oct. 27, 1953 — W. H. HARSTICK — 2,656,928
MILK STRAINER FOR SEPARATOR SUPPLY CANS
Filed Nov. 21, 1951 — 2 Sheets-Sheet 1

INVENTOR.
William H. Harstick
BY Paul O. Pippel
Atty.

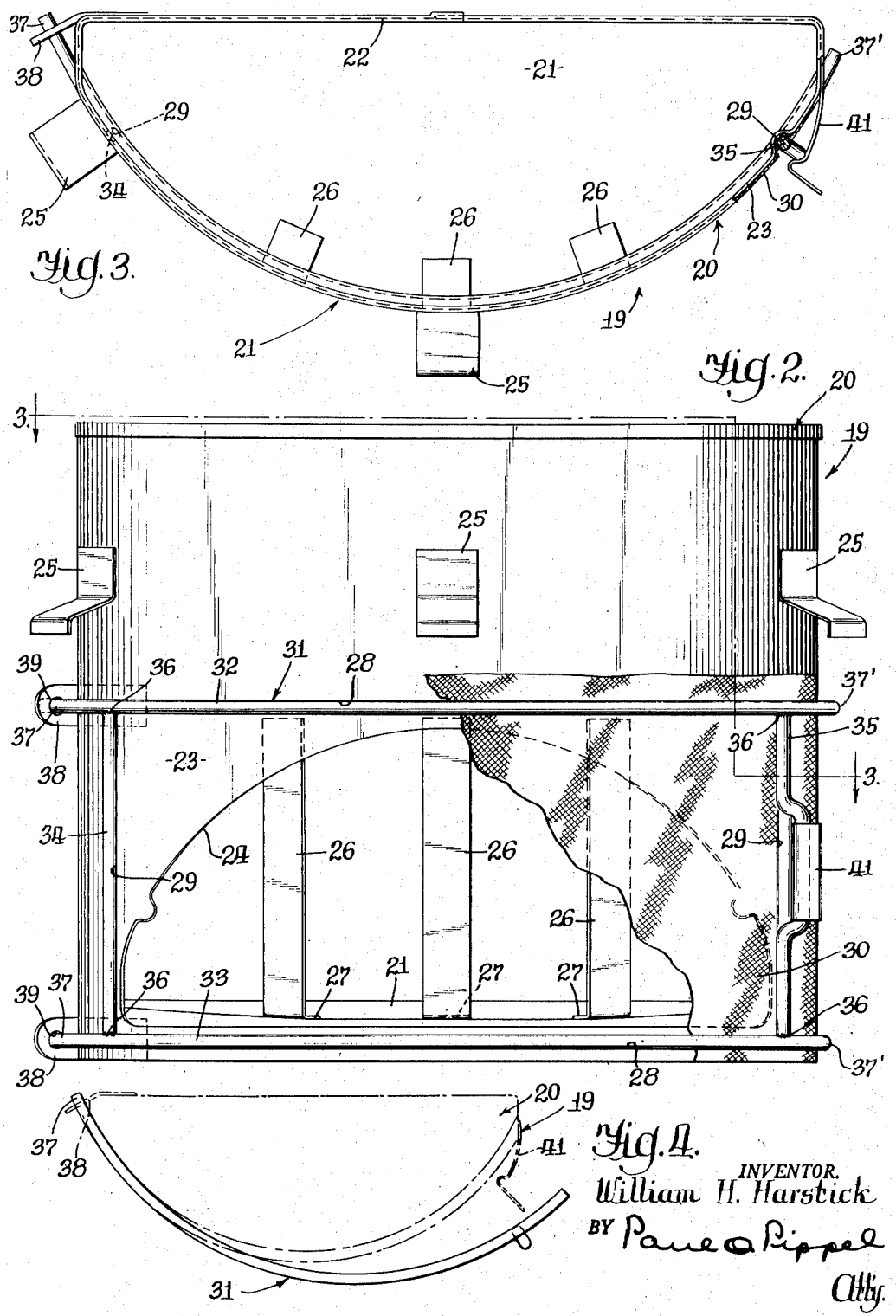

Patented Oct. 27, 1953

2,656,928

UNITED STATES PATENT OFFICE 2,656,928

MILK STRAINER FOR SEPARATOR SUPPLY CANS

William H. Harstick, Oak Park, Ill., assignor to International Harvester Company, a corporation of New Jersey Application November 21, 1951, Serial No. 257,453

5 Claims. (Cl. 210—158)

1

This invention relates to an improved milk strainer assembly. More particularly the invention relates to a milk strainer which is adaptable for use with the supply can of a cream separator.

In a centrifugal separator the supply can for supplying milk to the separating bowl generally is provided with a float and valve element designed to control the flow of liquid from the supply can so that a constant quantity is discharged. The float generally takes up a considerable space within the supply can and therefore the conventional type of flat bowl strainer is inadequate since it cannot be made large enough to adequately accommodate the large amounts of milk which are delivered to the strainer unit. It is therefore a prime object to provide an improved strainer assembly which can be supported on the inside of the can without interfering with any parts of the float structure, the strainer being large enough to accommodate and filter a large quantity of milk which is delivered thereto.

Still another object is to provide a strainer assembly for straining milk delivered to the supply can of a cream separator, the strainer assembly generally conforming to the contour of the supply can and having an opening in one side thereof for directing milk outwardly toward the inner side of the supply can.

A still further object is to provide a strainer assembly for straining milk, the assembly including a side opening over which a substantially large filtering element may be clamped and including an improved clamping element for securely clamping the filtering element over the opening.

Still another object is to provide a strainer assembly having an opening in one side thereof, the opening normally being covered by a filtering cloth, the strainer further including a groove extending around the opening adjacent the edge of said opening, said groove being arranged to receive edges of the filtering element which are clamped in the groove by a detachable rod assembly having a configuration conforming to the shape of the groove, the rod assembly being flexible and being detachably connected within said groove.

A still further object is to provide a strainer assembly having a side wall provided with an opening, the wall including a plurality of grooves which are interconnected and which extend about the opening, the groove being adapted to receive a plurality of interconnected rods which resiliently clamp edge portions of a filtering element within the grooves, and detachable means engaging the rods for normally clamping them in assembly with the casing.

2

These and further objects will become more readily apparent from a reading of the specification when examined in connection with the accompanying sheets of drawings.

In the drawings:

Figure 2 is a front elevational view of a strainer assembly embodying the features of the invention.

Figure 3 is a plan view partly in section of the strainer assembly shown in Figure 2, the section being taken on the line 3—3 of Figure 2.

Figure 4 is a plan view of a clamping element shown in position ready for clamping in engagement with a strainer structure which is schematically shown.

Figure 1:
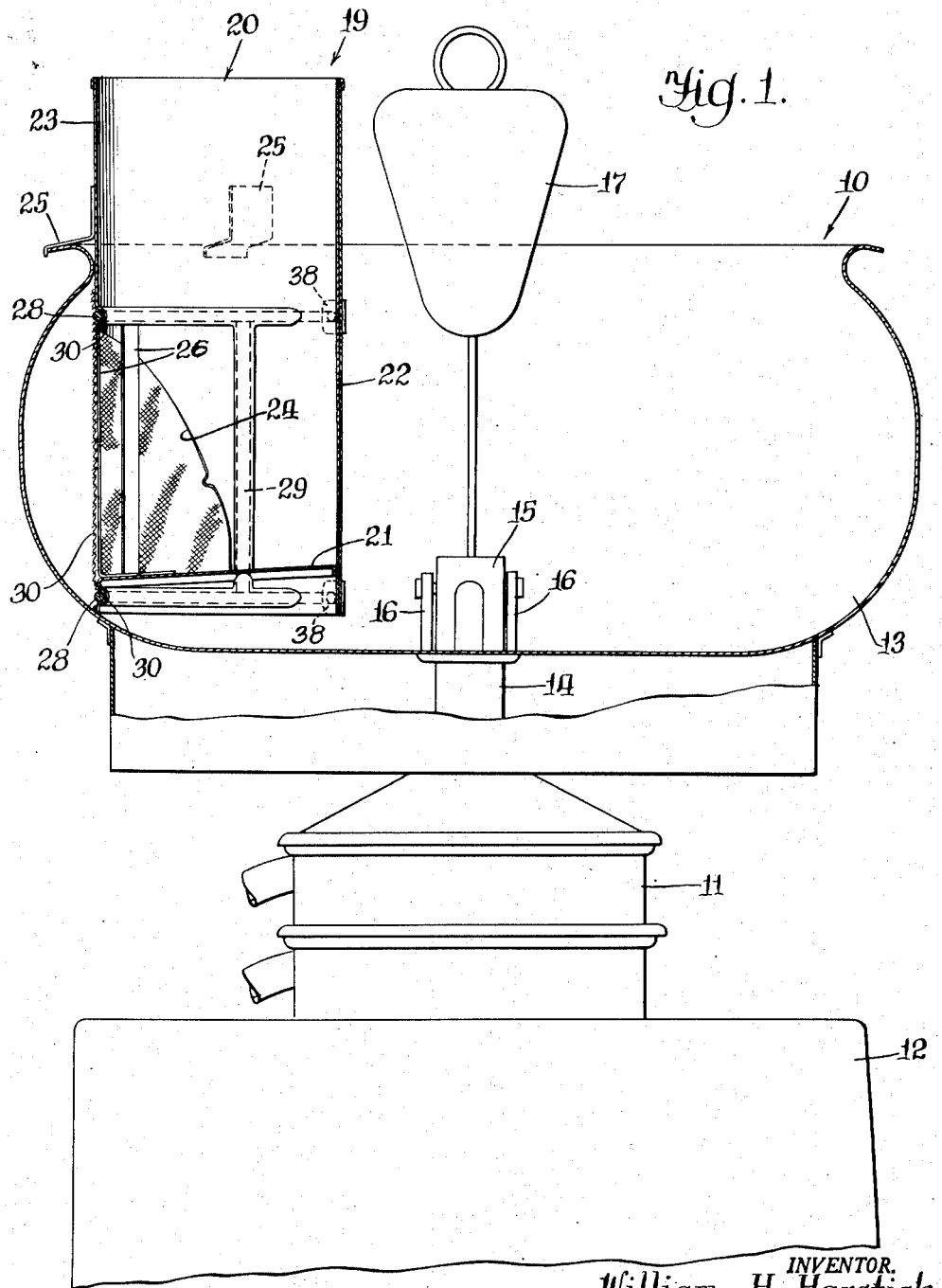
Figure 1 is a sectional view through a cream separator supply can showing an associated float structure and a sectional view through a strainer assembly which is supported within the supply can.

Portions of a cream separator structure 10 are shown in Figure 1. The cream separator structure 10 includes a conventional tinware construction 11 in which a separating bowl (not shown) is positioned. The tinware structure 11 is supported on a housing 12 and a supply can 13 is supported above the tinware construction 11. The supply can 13 includes a discharge spout 14 adapted to deliver liquid to the separating bowl which is enclosed within the tinware construction 11. A valve 15 is positioned within the supply can 13 the valve 15 being pivotally supported on brackets 16 extending upwardly from the discharge spout 14. A float 17 is connected to the valve 15, the float serving to move the valve in response to the decrease in the liquid level within the supply can for controlling the amount of liquid delivered to the discharge spout 14. The float construction may operate in a conventional manner for assuring that a constant quantity of milk is delivered to the separating bowl for separation.

As best shown in Figures 1, 2 and 3, a strainer structure is generally indicated by the reference character 19. The strainer structure 19 includes a casing 20 which is provided with a bottom wall 21, a rear wall 22 and a front wall 23. The bottom wall 21 is shaped in the form of an arcuate segment and the front wall 23 is also of arcuate configuration to conform to the bottom wall 21. The front wall 23 has its ends connected to the rear wall 22 as best indicated in Figure 3. The shape of the strainer structure 19 is such that it conforms to the supply can 13 which is shown as being of a circular construction. As indicated in Figure 1 the strainer structure 19 is positioned on one side of the float 17 and valve 15, the spacing between the strainer structure 19 and the float 17 being such that the float is free to operate in the conventional manner desired. The front wall 23 is provided with an enlarged discharge opening 24 as best shown in Figures 1 and 2. The front wall 23 is also provided with a plurality of arms or clips 25 which project outwardly for engaging the edges of a supply can 13 as best indicated in Figure 1 to support the strainer structure 19 within the supply can 13.

A plurality of laterally spaced supports 26 are positioned across the opening 24. The supports 26 may be suitably secured at their upper ends to the front wall 23, the said supports 26 being provided at their lower ends with flanges 27 which may be suitably fastened to the bottom wall 21.

A pair of horizontal grooves 28 are formed in the front wall 23, the said grooves 28 being substantially parallel with respect to each other, each groove being disposed on opposite sides of the opening 24. As best shown in Figure 1 the grooves 28 when viewed from the inside of the strainer 19 have the appearance of beads since the material of the front wall 23 is embossed inwardly to form said grooves. The horizontal grooves 28 are connected by a pair of vertical grooves 29 which are positioned on opposite sides of the opening 24. The connection of the grooves 29 with the grooves 28 actually provides a rectangular continuous groove extending about the opening 24. The terms horizontal and vertical are utilized in a non-limiting sense for the purposes of description, the reference being to the normal position in which the strainer 19 is utilized as best indicated in Figure 1.

A filtering cloth 30 is positioned over the opening 24. The filtering cloth 30 consists of a porous fabric of a type which is particularly adaptable for filtering milk. The filtering cloth 30 is securely clamped over the opening 24 by means of a clamping member or rod assembly 31. The rod assembly 31 as best shown in Figure 2 includes a pair of substantially parallel rods 32 and 33 which are connected by means of laterally extending rods 34 and 35. The rods 34 and 35 are connected to the rods 32 and 33 by means of welds 36 as indicated. The rods 34 and 35 are suitably spaced from the ends of the rods 32 and 33 to provide extensions 37 and 37'. The rod assembly 31 is so formed that the rods 32 and 33 engage and are seated in the grooves 28 provided in the front wall 23 and the rods 34 and 35 suitably engage the grooves 29. Since edges of the filtering cloth 30 are positioned underneath the rod assembly 31, the edges of the filtering cloth 30 are securely clamped and pressed in the grooves 28 and 29. Thus the filtering cloth 30 has all of its edges in secure clamping engagement with the front wall 23. Positioned at one end of the strainer structure 19 are a pair of vertically spaced ears or brackets 38, each of which is provided with an aperture 39. The extensions 37 of the rod assembly 31 engage the apertures 39 in telescoping relation. The apertures 39 are sufficiently large so that the clamping member or rod assembly 31 is suitably hinged on said ears 38. The rod 35 is provided with a bail shaped portion 40 which is engaged by a spring clip 41 in turn connected to the casing 20. The spring clip 41, as best shown in Figures 3 and 4, engages the bail shaped portion 40 in a manner wherein the rods 32, 33, 34, and 35 are rigidly though detachably secured in the grooves and the filtering cloth is positively clamped over the opening 24.

As indicated in Figure 4 the rod assembly 31 is flexible in that all of the rods have a certain resiliency which causes the clamping member 31 to assume the position shown in Figure 4 when the spring clip 41 is released from the bail shaped portion 40. This resiliency of the rod assembly causes the filtering cloth to be firmly clamped in the grooves.

As indicated in Figure 1 the clips 25 serve to support the strainer structure 19 on the casing 20 in a vertical position within the supply can 13. The strainer structure 19 is positioned to one side of the float 17 in an out-of-the-way position. The front wall 23 conforms generally to the rounded or circular shape of the supply can 13. During operation of the strainer structure, whole milk is delivered to the strainer, this milk being discharged through the opening 24 and through the filtering cloth 30. By virtue of the large opening 24 a large quantity of liquid can be supplied to the strainer structure 19 and filtered promptly. The particular shape of the strainer structure and its side opening permits a maximum of filtering area to be utilized despite the lack of space within the supply can occasioned by the float 17 and valve 15.

By means of the novel clamping member or rod assembly 31 a large filtering cloth may be firmly clamped over the opening 24, the filtering cloth being suitably supported over the opening by means of the supports 26. All edges of the cloth are rigidly secured within the grooves and any milk that passes through the opening 24 must pass through the filtering element 30. It can be seen by the novel arrangement as disclosed that the filtering cloth 30 can be quickly replaced by simply unlatching the spring clip 41 and by hinging the rod assembly 31 away from the front wall 23.

It is now believed that a novel strainer assembly has been disclosed, the assembly fully achieving all of the stated objects. It must be understood that changes may be made in the design without departing from the spirit of the invention as disclosed nor the scope thereof as defined in the appended claims.

What is claimed is:

1. A strainer assembly for cream separator supply cans comprising a casing including a bottom wall in the shape of an arcuate segment, a rear wall projecting from the bottom wall and an arcuate front wall conforming to the shape of the bottom wall, said front wall having end portions connected to said rear wall, said front wall including a liquid discharge opening, a plurality of laterally spaced supports connected to the front wall over said discharge opening, arms connected to said front wall, said arms projecting outwardly from the front wall and adapted to engage the rim of a supply can for supporting the strainer assembly thereon, a pair of substantially parallel horizontally extending grooves formed in the front wall, each groove being positioned on opposite sides of said discharge opening, a pair of vertically extending grooves formed in said front wall, said vertical grooves extending in substantially parallel relation, being positioned on opposite sides of the discharge opening and connecting the horizontally extending grooves, means for clamping a filtering element over said opening comprising a first pair of laterally spaced substantially parallel flexible rods, a second pair of laterally spaced substantially parallel flexible rods connected to the first pair of rods inwardly from the ends thereof, the rods being adapted to engage and conform to the horizontal and vertical grooves of the front wall for resiliently clamping edges of a filtering element in said grooves, a pair of vertically spaced ears projecting outwardly from the casing on one side of the opening, each of said ears having an aperture adapted to receive the ends of the first rods in telescoping relation, and a spring clip connected to the casing on the opposite side of the opening for engaging one of the rods for retaining the clamping means in said grooves.

2. A strainer assembly for cream separator supply cans comprising a casing including a bottom wall, a rear wall projecting from the bottom wall and an arcuately shaped front wall connected to the bottom wall and to said rear wall, said front wall including a liquid dicharge opening, a plurality of laterally spaced supports connected to the front wall over said discharge opening, a pair of substantially parallel horizontally extending grooves formed in the front wall, each groove being positioned on opposite sides of said discharge opening, a pair of vertically extending grooves formed in said front wall, said vertical grooves extending in substantially parallel relation, being positioned on opposite sides of the discharge opening and connecting the horizontally extending grooves, means for clamping a filtering element over said opening comprising a first pair of laterally spaced substantially parallel flexible rods, a second pair of laterally spaced substantially parallel flexible rods connected to the first pair of rods, one of said second pair of rods being spaced inwardly from the ends of the first pair of rods, the rods being adapted to engage and conform to the horizontal and vertical grooves of the front wall for resiliently clamping edges of a filtering element in said grooves, a pair of vertically spaced ears projecting outwardly from the casing on one side of the opening, each of said ears having an aperture adapted to receive the ends of the first pair of rods in telescoping relation, and a spring clip connected to the casing on the opposite side of the opening for engaging one of the second pair of rods for retaining the clamping means in said grooves.

3. A strainer assembly for cream separator supply cans comprising a casing including a bottom wall, a rear wall projecting from the bottom wall and an arcuately shaped front wall connected to the bottom wall and to said rear wall, said front wall including a liquid discharge opening, a pair of substantially parallel horizontally extending grooves formed in the front wall, each groove being positioned on opposite sides of said discharge opening, a pair of vertically extending grooves formed in said front wall, said vertical grooves extending in substantially parallel relation, being positioned on opposite sides of the discharge opening and connecting the horizontally extending grooves, means for clamping a filtering element over said opening comprising a first pair of laterally spaced substantially parallel flexible rods, a second pair of laterally spaced substantially parallel flexible rods connected to the first pair of rods, one of said second pair of rods being spaced inwardly from the ends of the first pair of rods, the rods being adapted to engage and conform to the horizontal and vertical grooves of the front wall for resiliently clamping edges of a filtering element in said grooves, a pair of vertically spaced ears projecting outwardly from the casing on one side of the opening, each of said ears having an aperture adapted to receive the ends of the first pair of rods in telescoping relation, and a spring clip connected to the casing on the opposite side of the opening for engaging one of the second pair of rods for retaining the clamping means in said grooves.

4. A strainer assembly for cream separator supply cans comprising a casing including a bottom wall, a rear wall projecting from the bottom wall and an arcuately shaped front wall connected to the bottom wall and to said rear wall, said front wall including a liquid discharge opening, a pair of substantially parallel horizontally extending grooves formed in the front wall, each groove being positioned on opposite sides of said discharge opening, a pair of vertically extending grooves formed in said front wall, said vertical grooves extending in substantially parallel relation, being positioned on opposite sides of the discharge opening and connecting the horizontally extending grooves, means for clamping a filtering element over said opening comprising a first pair of laterally spaced substantially parallel flexible rods, a second pair of laterally spaced substantially parallel flexible rods connected to the first pair of rods, one of said second pair of rods being spaced inwardly from the ends of the first pair of rods, the rods being adapted to engage and conform to the horizontal and vertical grooves of the front wall for resiliently clamping edges of a filtering element in said grooves, a pair of vertically spaced ears projecting outwardly from the casing on one side of the opening, each of said ears having an aperture adapted to receive the ends of the first pair of rods in telescoping relation, and means for detachably securing said clamping means in said grooves.

5. A strainer assembly comprising a casing, a wall on said casing having a liquid discharge opening, a first pair of grooves formed on opposite sides of said discharge opening in said wall, a second pair of grooves formed in said wall, said second pair of grooves extending laterally with respect to said first pair of grooves on opposite sides of the opening for connection with said first pair of grooves, means for clamping a filtering element over said discharge opening comprising a flexible generally rectangular rod assembly including a first pair of laterally spaced rod elements, a second pair of laterally spaced rod elements connected at their ends to the rod elements of the first pair to form a unitary structure, means hingedly connecting said rod assembly to said casing, and means on the casing detachably engaging said rod assembly for securing said rods in resilient clamping engagement with the edges of a filtering element and within said grooves, said means including a resilient latch element engaging one of the laterally spaced rod elements.

WILLIAM H. HARSTICK.

References Cited in the file of this patent

UNITED STATES PATENTS

| Number | Name | Date |
|---|---|---|
| 323,780 | Brown | Aug. 4, 1885 |
| 370,870 | Howard | Oct. 4, 1887 |
| 718,367 | Merritt | Jan. 13, 1903 |
| 737,171 | Szentjanossy | Aug. 25, 1903 |
| 1,517,725 | Gossman | Dec. 2, 1924 |
| 1,530,411 | Restchak | Mar. 17, 1925 |
| 1,630,198 | McMahon | May 24, 1927 |
| 1,720,433 | Parker | July 9, 1929 |

FOREIGN PATENTS

| Number | Country | Date |
|---|---|---|
| 101,771 | Great Britain | Oct. 19, 1916 |